UNITED STATES PATENT OFFICE.

GEORGE A. DENNIS, OF OAKLAND, CALIFORNIA, ASSIGNOR OF FORTY-NINE ONE-HUNDREDTHS TO MALOTT & PETERSON, OF SAN FRANCISCO, CALIFORNIA, A CORPORATION.

COMPOSITION FOR USE WITH RAW LINSEED-OIL FOR FILLING, SMOOTHING, STAINING, AND POLISHING WOOD.

1,168,485.      Specification of Letters Patent.      Patented Jan. 18, 1916.

No Drawing.      Application filed August 31, 1914. Serial No. 859,293.

*To all whom it may concern:*

Be it known that I, GEORGE A. DENNIS, a citizen of the United States, residing at Oakland, in the county of Alameda, State of California, have invented a new and useful Composition for Use with Raw Linseed-Oil for Filling, Smoothing, Staining, and Polishing Wood, of which the following is a specification.

My composition consists of a mixture of manganese in the form of an oxid, or sulfate or oxalate, or borate, and talc, combined in the proportions stated, viz: talc, (creta galleum,) 9 parts; manganese oxid or manganese sulfate or manganese oxalate or manganese borate, 1 part. These ingredients are to be reduced to a dry powder and thoroughly mingled by agitation.

In using the above-named composition the wood surface to be polished should first be made comparatively smooth and clean, then the raw linseed oil, which if desirous may contain a suitable drier, is applied by means of a brush or saturated cloth. After the linseed oil has been partially absorbed by the wood, the above described composition is sprinkled sparsely over the oiled surface then rubbed into the pores and cracks till same are thoroughly filled. The effect of the linseed oil after coming in contact with the composition is to reduce it to the consistency of putty for the time being, which after allowing to "set" for the matter of a few hours, becomes as hard as the wood surface itself and remains permanently in this condition. All that now remains to be done in order to produce a highly polished surface, is to lightly go over the surface with very fine grain sand-paper and then rub off with a dry cloth or piece of carpet.

The effect produced by using the above named composition in the manner described, is to make a highly polished surface of the wood itself which is extremely hard and is not easily scratched or marred. It differs from a polish as produced by a varnish or shellac, as the latter materials remain on the surface of the wood only, while my material permeates or "sinks in" for a depth of about one sixteenth of an inch. Moreover my polishing composition is both fresh and salt water proof; nor is it in any way affected by the sun, making it adaptable for use in places which must stand the varying conditions of the weather. Because of its easy manner of applying over large areas and the hard but not brittle surface resulting when finished, it is an extremely satisfactory and cheap material to use for polishing floors, linoleum, cement, magnasite, wainscoting and all other interior house finishing. If given two applications after the manner above described, and then thoroughly "rubbed down" it will produce a polish on furniture equal to that obtained by ordinary material, and methods only after five or six "coats" have been applied.

Any stain desired for the various kinds of wood is obtained by mixing the ordinary staining pigment in the correct proportion, in the linseed oil previous to applying in the manner above described.

I am aware that various compositions have been used in conjunction with linseed oil for the same purpose, but I am not aware that the ingredients of my composition have been used together.

What I claim, and desire to secure by Letters Patent of the United States, is

The herein described composition of matter, consisting of talc and manganese borate, substantially in the proportions described, to be used in conjunction with linseed oil as and for the purposes mentioned.

In testimony whereof, I have signed my name to this specification in the presence of two subscribing witnesses.

GEORGE A. DENNIS.

Witnesses:
DAVE HIRSTEL,
RUTH NEUMANN.